US006814480B2

United States Patent
Amano

(10) Patent No.: US 6,814,480 B2
(45) Date of Patent: Nov. 9, 2004

(54) LED-TYPE VEHICULAR LAMP HAVING IMPROVED LIGHT DISTRIBUTION

(75) Inventor: Yasuyuki Amano, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 115 days.

(21) Appl. No.: 10/212,790

(22) Filed: Aug. 7, 2002

(65) Prior Publication Data

US 2003/0035299 A1 Feb. 20, 2003

(30) Foreign Application Priority Data

Aug. 15, 2001 (JP) ........................................ P.2001-246633

(51) Int. Cl.[7] .............................................. F21V 13/04
(52) U.S. Cl. ...................... 362/545; 362/516; 362/520; 362/245; 362/327
(58) Field of Search ................................ 362/540, 297, 362/517, 521, 328, 800, 545, 516, 520, 245, 327, 544, 543, 518, 240, 241, 346, 348, 542, 541

(56) References Cited

U.S. PATENT DOCUMENTS

| 4,646,207 A | 2/1987 | Levin et al. |
| 4,929,866 A | 5/1990 | Murata et al. |
| 5,054,885 A | 10/1991 | Melby |
| 5,453,855 A | 9/1995 | Nakamura et al. |
| 6,637,923 B2 * | 10/2003 | Amano ..................... 362/545 |

FOREIGN PATENT DOCUMENTS

| DE | 19638081 | 9/1996 |
| DE | 100 58 659 A1 | 5/2002 |
| EP | 0 830 984 A2 | 3/1998 |
| JP | 11-306810 | 11/1999 |

* cited by examiner

Primary Examiner—Stephen Husar
Assistant Examiner—Bao Q Truong
(74) Attorney, Agent, or Firm—Sughrue Mion, PLLC

(57) ABSTRACT

A vehicular lamp which radiates a light by indirect illumination using a plurality of LED light sources which has a thin structure while providing sufficient light output to the front of the lamp, even in the case where the lamp is mounted in a wrap-around portion of the vehicle body. Respective Fresnel lenses which form light from respective LED light sources into parallel light fluxes are arranged so as to align the directions of the parallel light fluxes upward, and the parallel light fluxes are then reflected toward the front of the lamp by a reflector. The reflector is separated into sub-reflectors for every area which the parallel light fluxes from the respective Fresnel lenses strike, and the sub-reflectors are arranged in a stepped configuration extending in a lateral direction of the reflector from the front of the lamp toward the rear of the lamp. Accordingly, it is possible to form the reflector so as to wrap around to the rear of the lamp while the reflected light from the respective sub-reflectors is radiated toward the front of the lamp.

15 Claims, 7 Drawing Sheets

LED-TYPE VEHICULAR LAMP HAVING IMPROVED LIGHT DISTRIBUTION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp provided with a plurality of LED light sources, and more particularly to a vehicular lamp which radiates light by indirect illumination.

Recently, vehicular lamps provided with an LED light source have frequently been employed. As described in Japanese Patent Application Laid-Open No. 11-306810, a lamp has been developed which provides a soft lighting effect using an indirect illumination technique whereby the LED light source is arranged so as not to be visible from the front of the lamp.

Further, as described in German Patent Application No. 19638081, a lamp structure has been developed in which light from a plurality of LED light sources arranged facing upward is formed into an upward directed parallel light flux by a plurality of Fresnel lenses provided near an upper side of the LED light sources, and the parallel light flux from the Fresnel lenses is then reflected toward the front of the lamp by a reflector. It is possible to effectively utilize the light source light flux by combining the LED light sources and the Fresnel lenses.

However, the vehicular lamp described in German Patent Application No. 19638081 mentioned above is structured such that the reflector extends linearly in a lateral direction. Therefore, in the case where the lamp is mounted at a vehicle body rear end corner portion and is formed in such a manner as to wrap around and extend toward the front of the vehicle (or a vehicle body front end corner portion formed in such a manner as to wrap around toward the front of the vehicle), it is necessary to arrange the reflector relatively far apart from a translucent cover extending along the surface of the vehicle body to prevent interference with the translucent cover. Accordingly, there is a problem that the size of the lamp is rather large.

On the contrary, as shown in FIG. 7, by forming a reflector 102 so as to wrap around along a translucent cover 104 and arranging a plurality of sets of LED light sources 106 and Fresnel lenses 108 on a curve following the wrap-around shape, it is possible to make the lamp thin. However, in such a lamp, the light by the reflector 102 from the respective LED light sources 106 is reflected in a direction normal to the curve, as indicated by arrows in FIG. 7. Therefore, there is a problem that it is not possible to obtain sufficient light radiated to the front of the lamp.

BRIEF SUMMARY OF THE INVENTION

Taking the foregoing situation into consideration, it is an object of the present invention to provide a vehicular lamp in which light is radiated by means of indirect illumination using a plurality of LED light sources and in which it is possible to make the lamp thin while a sufficient light output can be obtained to the front of the lamp, even in the case where the lamp is provided in a vehicle body wrap-around portion.

The present invention achieves the object mentioned above by providing an improved structure of a reflector.

That is, according to the present invention, a vehicular lamp is provided comprising: a plurality of LED light sources; a plurality of lenses for forming light from the respective LED light sources into respective parallel light fluxes; a reflector for reflecting the parallel light flux from each respective lens toward the front of the lamp; and a translucent cover provided on the front of the reflector, wherein the respective lenses are arranged so as to align the directions of the parallel light fluxes, the reflector is separated into sub-reflectors for every area of the reflector which the parallel light fluxes from the respective lenses strike, and the respective sub-reflectors are arranged in a stepped configuration stepping rearward from a front end position of the reflector toward a rear end position of the lamp.

The specific structure of the lens is not particularly limited so long as the lens can form the light from the LED light source into a parallel light flux. For example, it is possible to employ a single spherical lens, a combination lens, a Fresnel lens, or the like.

The specific direction of the parallel light fluxes is not particularly limited so long as the direction is in the direction of a line intersecting the longitudinal direction of the lamp. For example, it is possible to set it to an upward direction or a lateral direction by making it perpendicular to the longitudinal direction of the lamp.

The reflector may be structured such that a plurality of sub-reflectors are integrally formed, or may be structured such that the sub-reflectors are independently formed.

The specific structure of each of the sub-reflectors, such as the shape, size or the like, is not particularly limited as long as the sub-reflectors reflect the parallel light fluxes from each of the lenses toward the front of the lamp.

The direction perpendicular to the longitudinal direction of the lamp mentioned above may be the lateral direction of the lamp, the vertical direction of the lamp, or the diagonal direction of the lamp.

The vehicular lamp according to the present invention is constructed such that the plurality of lenses which form the light from a plurality of LED light sources into parallel light fluxes are arranged so as to align the radiating directions of the parallel light fluxes. Further, the reflector for reflecting the parallel light fluxes from the respective lenses toward the front of the lamp is separated into sub-reflectors for every area of the reflector which the parallel light fluxes from the respective lenses strike, and the respective sub-reflectors are arranged in a stepped configuration extending from the front end of the lamp toward the rear end of the lamp. With these arrangements, the following effects can be obtained.

Because the reflector is constituted by a plurality of sub-reflectors arranged in a stepped configuration, even in the case where the translucent cover is formed so as to wrap around to the rear of the lamp with respect to the direction perpendicular to the longitudinal direction of the lamp, it is possible to form the reflector so as to wrap around along the translucent cover while the reflected light from the respective sub-reflectors is radiated toward the front of the lamp.

Therefore, in the vehicular lamp of the invention structured such that light is radiated by indirect illumination using a plurality of LED light sources, it is possible to achieve a thin structure of the lamp as well as sufficient radiated light to the front of the lamp, even in the case where the lamp is designed to be mounted in a vehicle body wrap-around portion.

In the structure mentioned above, the lengths in the radiating direction of the parallel light fluxes of each of the sub-reflectors may be made the same, or the lengths may be set to different values from each other corresponding to the shape of the lamp or the like. In the case of employing the latter structure, if the sub-reflectors are formed such that the tilt angle relative to the front of the lamp, that is, with respect to the vertical direction of lamp, becomes larger as the length of the sub-reflectors in the direction of the parallel light fluxes radiating direction becomes shorter, it is possible to make all the parallel light fluxes from the respective lenses strike the reflecting surface of each of the sub-reflectors without loss.

The reflecting surface of each of the sub-reflectors may be constituted by a single curved surface, or the surface may be constituted by a plurality of reflective elements. In the latter case, when the reflecting surface of each of the sub-reflectors is divided into a plurality of segments, and a reflective element and a step portion are formed in each of the segments such that the reflecting surface is formed in a stepped configuration, it is possible to effectively radiate the light to the front of the lamp.

Moreover, if each of the reflective elements is constituted by a curved surface which reflects the parallel light flux from the lens in a diffused manner in vertical direction and lateral directions, it is possible to obtain the required lamp light distribution performance even if the translucent cover is formed in a plain configuration. (By "plain configuration" is meant that the translucent cover has no lens elements to diffuse the light passing therethrough.)

Alternatively, each of the reflective elements can be constituted by a flat plane so as to reflect the parallel light flux from the lens toward the front of the lamp while maintaining the light flux parallel, in which case diffusion lens elements are formed in the translucent cover or the like, thereby diffusing the light in both the vertical and lateral direction. In another alternative configuration, the reflective elements can each be constituted by a curved surface having curvature only in one direction so as to reflect the parallel light fluxes from the lens toward the front of the lamp only in one direction in a diffused manner, in which case diffusion lens elements are formed in the translucent cover or the like to diffuse the light in the direction perpendicular to the one direction mentioned above.

DETAILED DESCRIPTION OF THE INVENTION

A description will be given below with reference to the accompanying drawings of a preferred embodiment of a vehicular lamp constructed according to the present invention.

Figure 1:
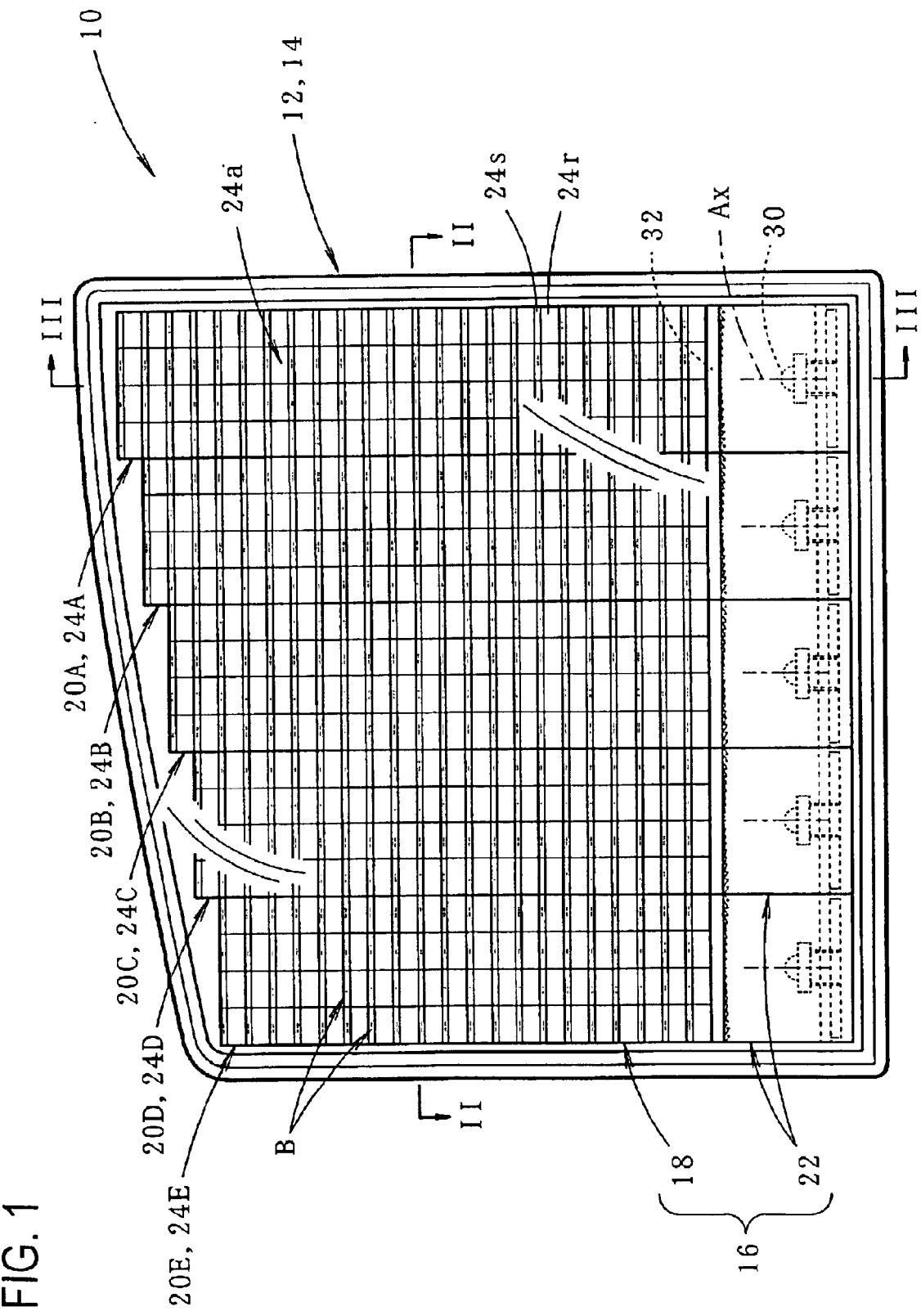
FIG. 1 is a front elevational view showing a vehicular lamp constructed according to a preferred embodiment of the present invention.
Figure 2:
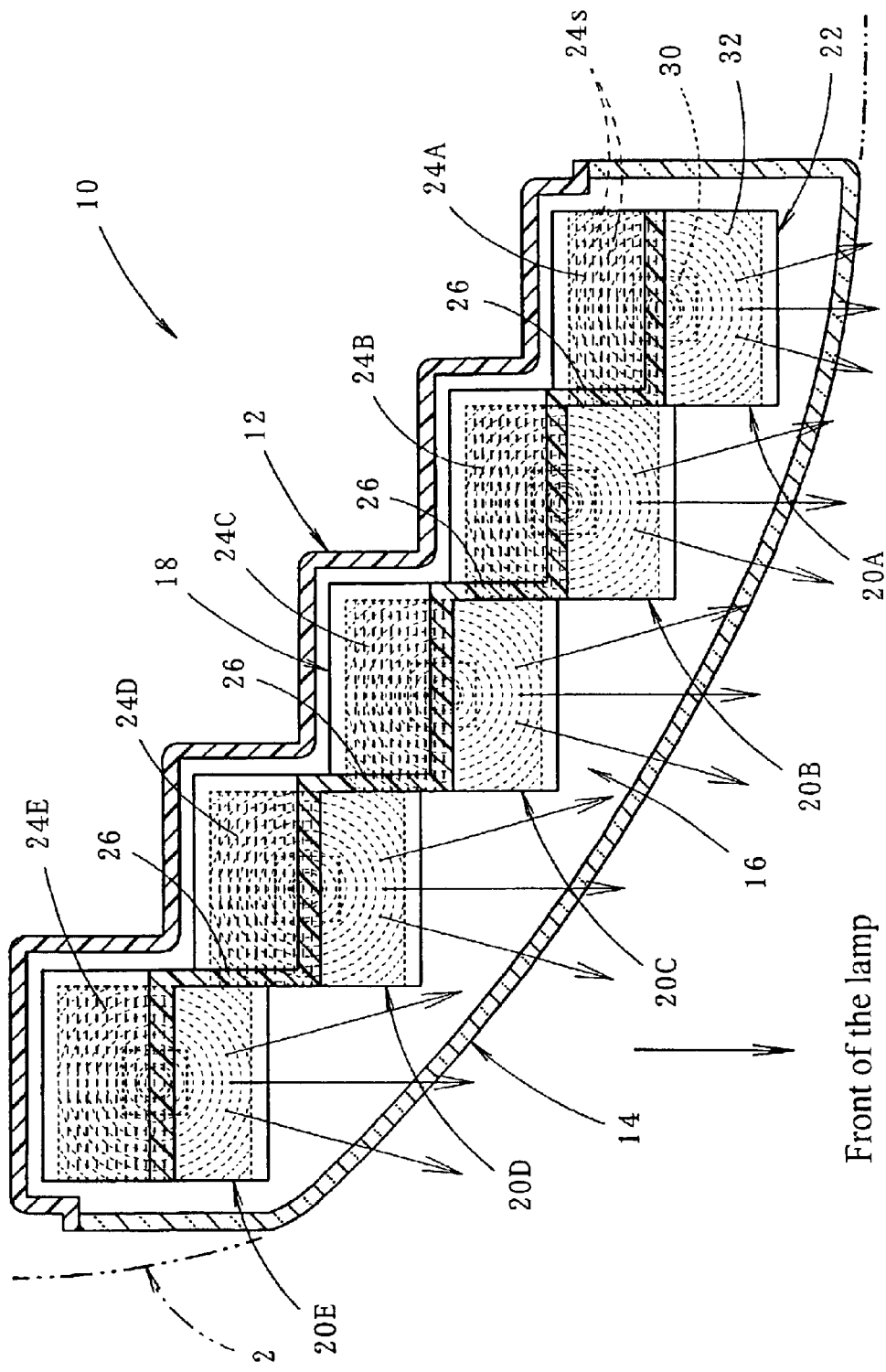
FIG. 2 is a cross-sectional view taken along a line II—II in FIG. 1.
Figure 3:
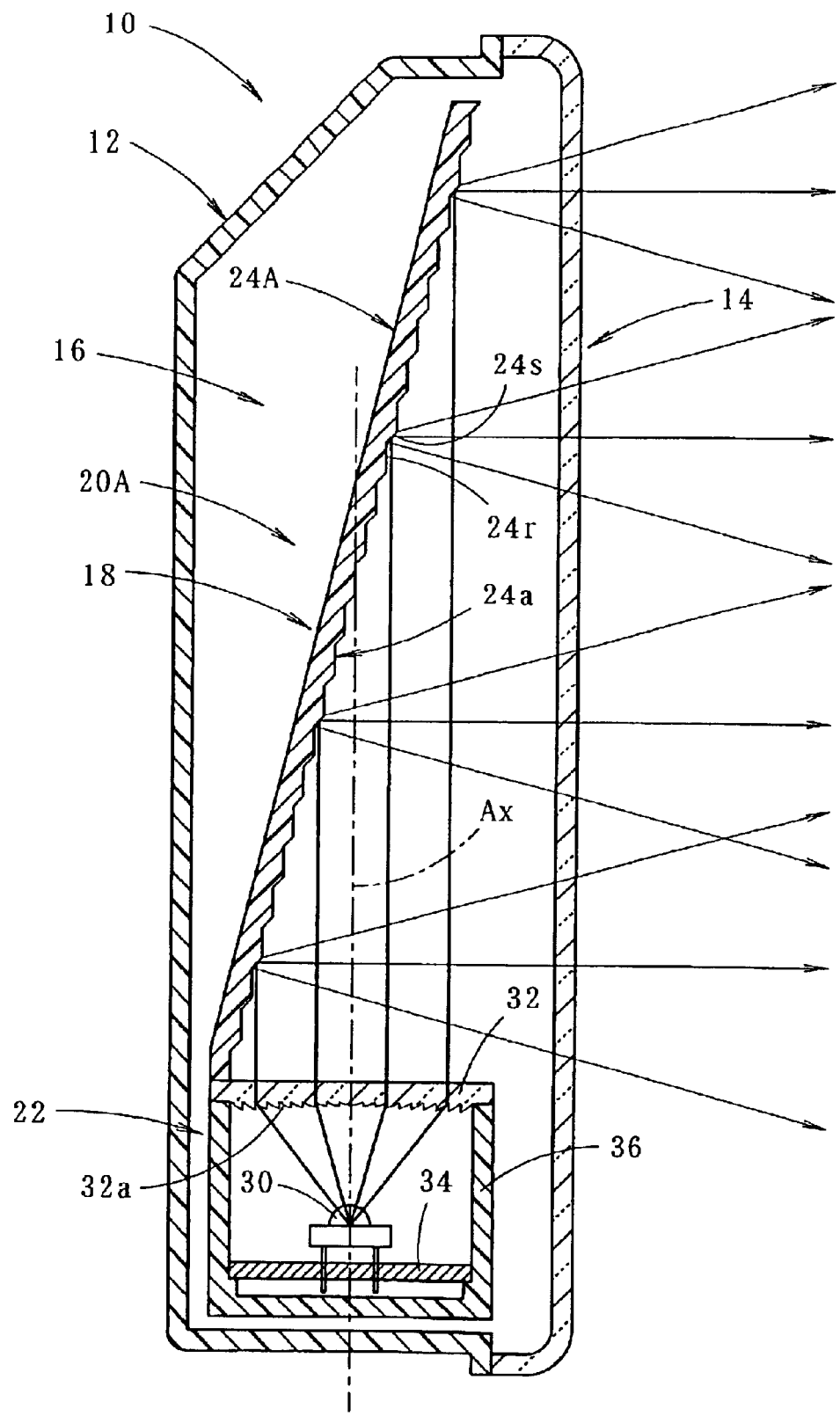
FIG. 3 is a cross-sectional view taken along a line III—III in FIG. 1.

FIG. 1 is a front elevational view showing a vehicular lamp according to the present embodiment, and FIGS. 2 and 3 are respectively a cross-sectional view taken along a line II—II in FIG. 1 and a cross-sectional view along a line III—III in FIG. 1.

As shown in these figures, a vehicular lamp 10 according to the present embodiment is a tail and stop lamp intended to be mounted in a left corner area of a rear end position in a vehicle. The lamp 10 is structured such that a lamp unit 16 is received within a lamp chamber constituted by a lamp body 12 and a plain, translucent cover 14.

As shown by a two-dot chain line in FIG. 2, a vehicle body 2 is formed so as to wrap around toward the front of the vehicle in a left corner area of a rear end position of the vehicle, and a translucent cover 14 is also formed so as to wrap around along the surface contour of the vehicle body 2.

A lamp unit 16 is constituted by a plurality (five in this example) of light source units 22, and a reflector 18 which reflects light from the respective light source units 22 toward the front of the lamp (i.e., the rear of the vehicle; the same terminology is applied in the following description). The reflector 18 is separated into sub-reflectors 24A, 24B, 24C, 24D and 24E for each of the light source units 22, and the respective light source units 22 and the respective sub-reflectors 24A to 24E constitute five LED units 20A, 20B, 20C, 20D and 20E.

The LED units 20A to 20E are assembled in a rectangular configuration in a top elevational view, and are arranged so as to be closely attached to each other in a lateral direction. These LED units 20A to 20E are arranged in a stepped configuration stepping rearward from a right end position of the lamp unit 16 toward a left end position at the rear of the lamp, thereby forming the lamp unit 16 in a shape suitable to wrap along the translucent cover 14.

The lamp body 12 is formed in a stepped configuration along the rear end surface of the lamp unit 16.

Figure 4:
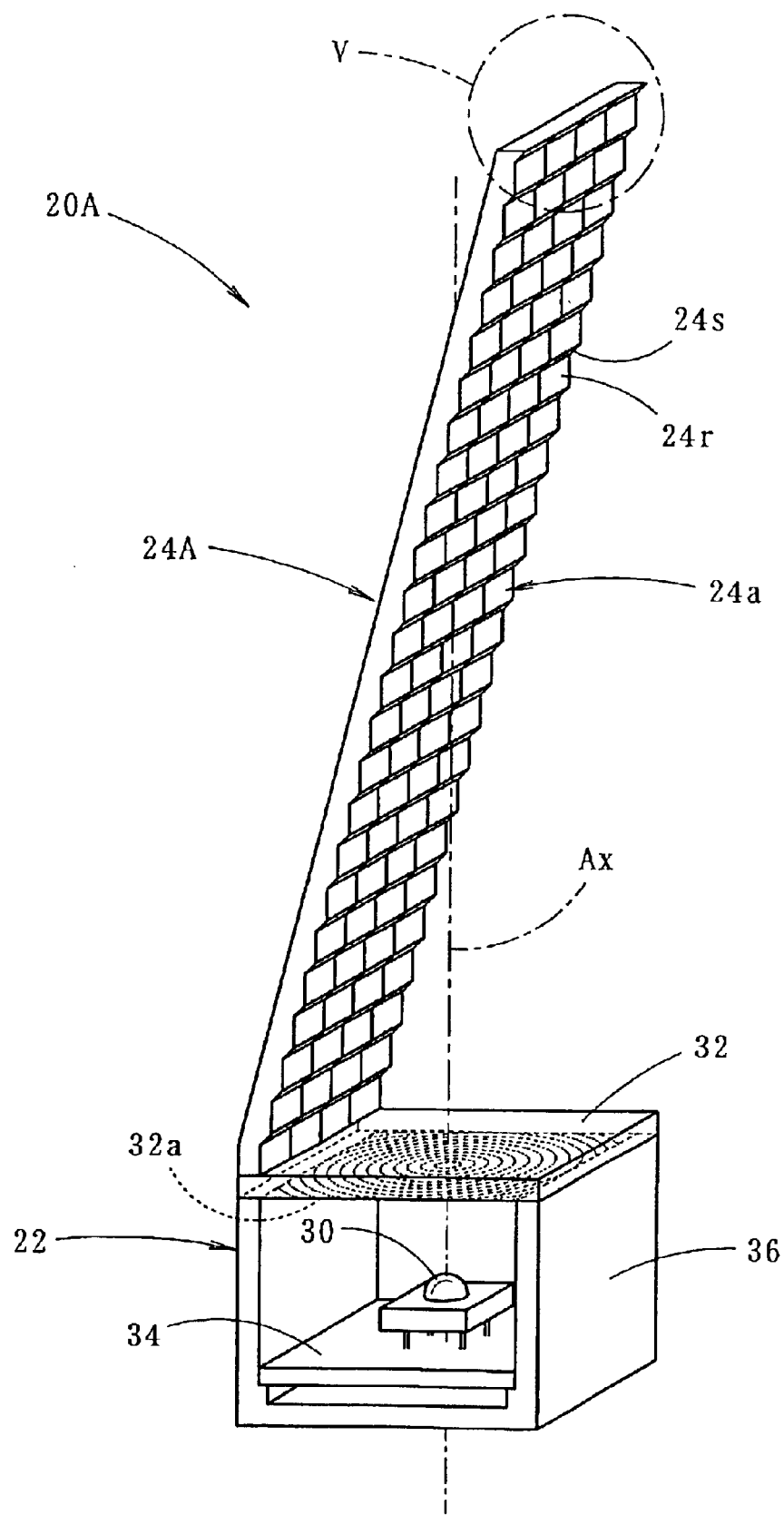
FIG. 4 is a cut-away, perspective view showing a LED unit positioned at a right end position among five LED units constituting the lamp unit of FIG. 1.

FIG. 4 is a perspective view showing in a cut-out manner a LED unit 20A, among the five LED units 20A to 20E constituting the lamp unit 16, positioned at a right end position.

As illustrated, the light source unit 22 of the LED unit 20A is constituted by a LED light source 30 arranged facing upward, a Fresnel lens 32 forming light from the LED light source 30 into a parallel light flux, a printed circuit board 34 supporting the LED light source 30, and a housing 36 supporting the printed circuit board 34 and the Fresnel lens 32.

The Fresnel lens 32 has an optical axis Ax extending in a vertical direction passing through a central position of the LED light source 30, and Fresnel lensing 32a is formed on a lower surface thereof. The printed circuit board 34 and the housing 36 extend in a lateral direction over the entire width of the lamp unit 16.

Further, the sub-reflector 24A of the LED unit 20A extends upward, tilted to the front from a rear end position of the light source unit 22, and is structured so as to reflect the parallel light flux radiated upward from the Fresnel lens 32 substantially at right angles toward the front of the lamp.

The reflecting surface 24a of the sub-reflector 24A is divided into a plurality of segments (twenty-four segments in this example) at a uniform interval with respect to the vertical direction, and a reflective element 24s and a step portion 24r are formed in each of the segments, whereby the reflecting surface is formed in a stepped configuration. Further, the reflecting surface 24a is structured so as to reflect the parallel light flux from the Fresnel lens 32 toward the front of the lamp in a diffused manner with each of the reflective elements 24s, and each of the step portions 24r is formed in a vertical surface so that the parallel light flux from the Fresnel lens 32 does not strike the step portions 24r. In this embodiment, the reflecting surface 24a is divided into a plurality of segments (four segments in this example) at a uniform interval with respect to the horizontal direction, and a reflective element 24s and step portion 24r are formed in each of the segments. The reflective element 24s and the step portion 24r constituting each of the segments are formed in the same shape in each of the stages.

Figure 5:
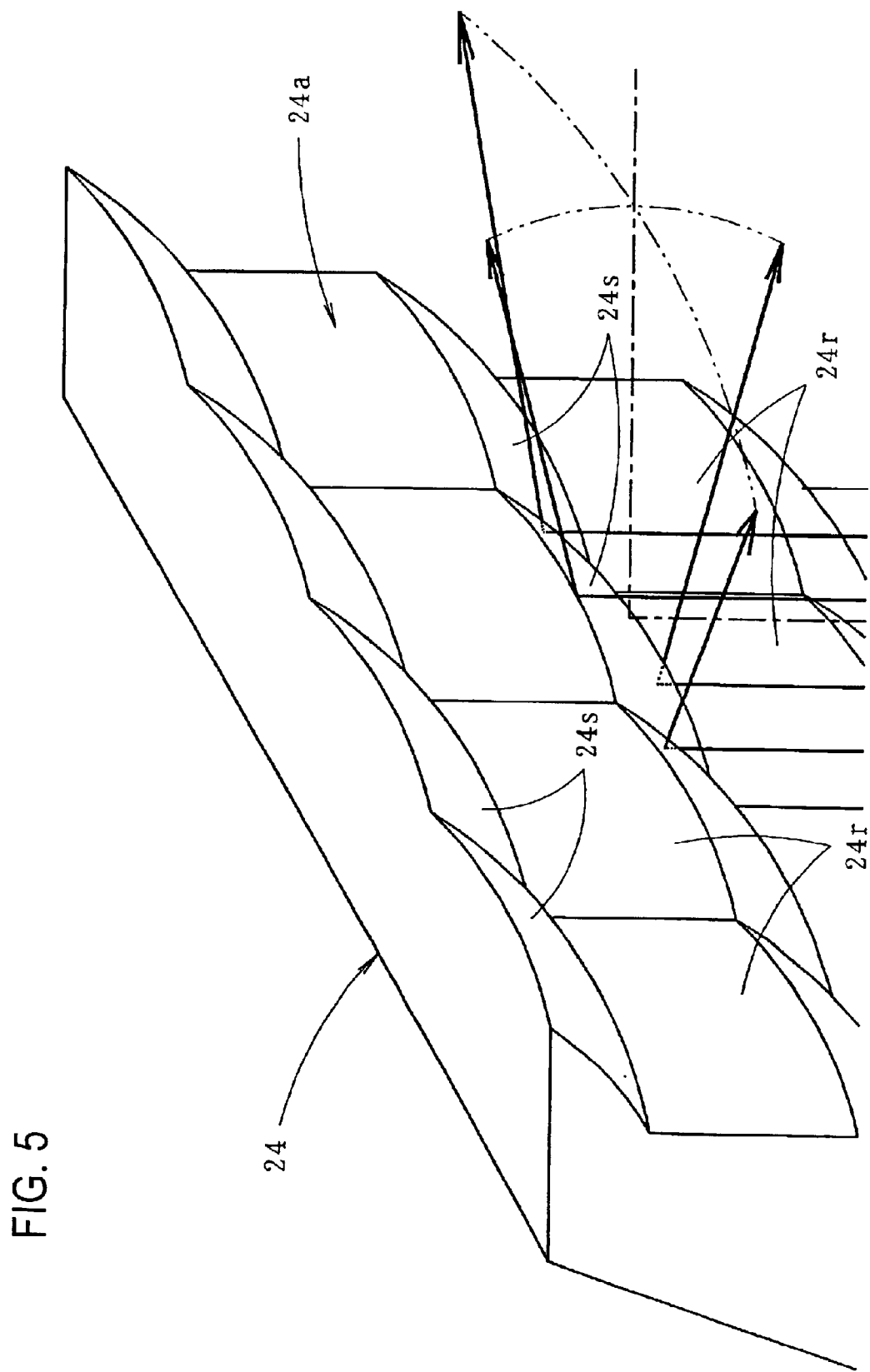
FIG. 5 is a detailed view of a portion V in FIG. 4.

FIG. 5 is a detailed view of a portion V in FIG. 4.

As illustrated, each of the reflective elements 24s is constructed by a substantially spherical curved surface so as to reflect the parallel light flux from the Fresnel lens 32 in a diffused manner at predetermined diffusion angles in a vertical direction and in a lateral direction with respect to a directly frontward direction of the lamp. The diffusion angles in the vertical direction and the lateral direction of each of the reflective elements 24s are the same among the respective reflective elements 24s. Further, each of the step portions 24r is constituted by a cylindrical curved surface so as to connect the respective reflective elements 24s that are adjacent vertically.

As shown in FIG. 1, the five LED units 20A to 20E constituting the lamp unit 16 have the same structure and are arranged in the same flat shape manner in the light source unit 22 thereof. However, the respective sub-reflectors 24A to 24E are different in height.

That is, the heights of the respective sub-reflectors 24A to 24E decrease from the LED unit 20A in the right-end position toward the LED unit 20E in the left-end position. Specifically, among the respective sub-reflectors 24A to 24E, the sizes of the segments sectioning the reflecting surface 24a are the same in a front view of the lamp, while the number of these segments varies in the vertical direction such that the number of the sub-reflectors 24A is twenty four, the number of the sub-reflectors 24B is twenty three, the number of the sub-reflectors 24C is twenty two, the number of the sub-reflectors 24D is twenty one, and the number of the sub-reflectors 24E is twenty. Therefore, the upper end shape of the reflector 18 along the translucent cover 14 is formed such that the upper end descends from the right-end position toward the left-end position.

Figure 6:
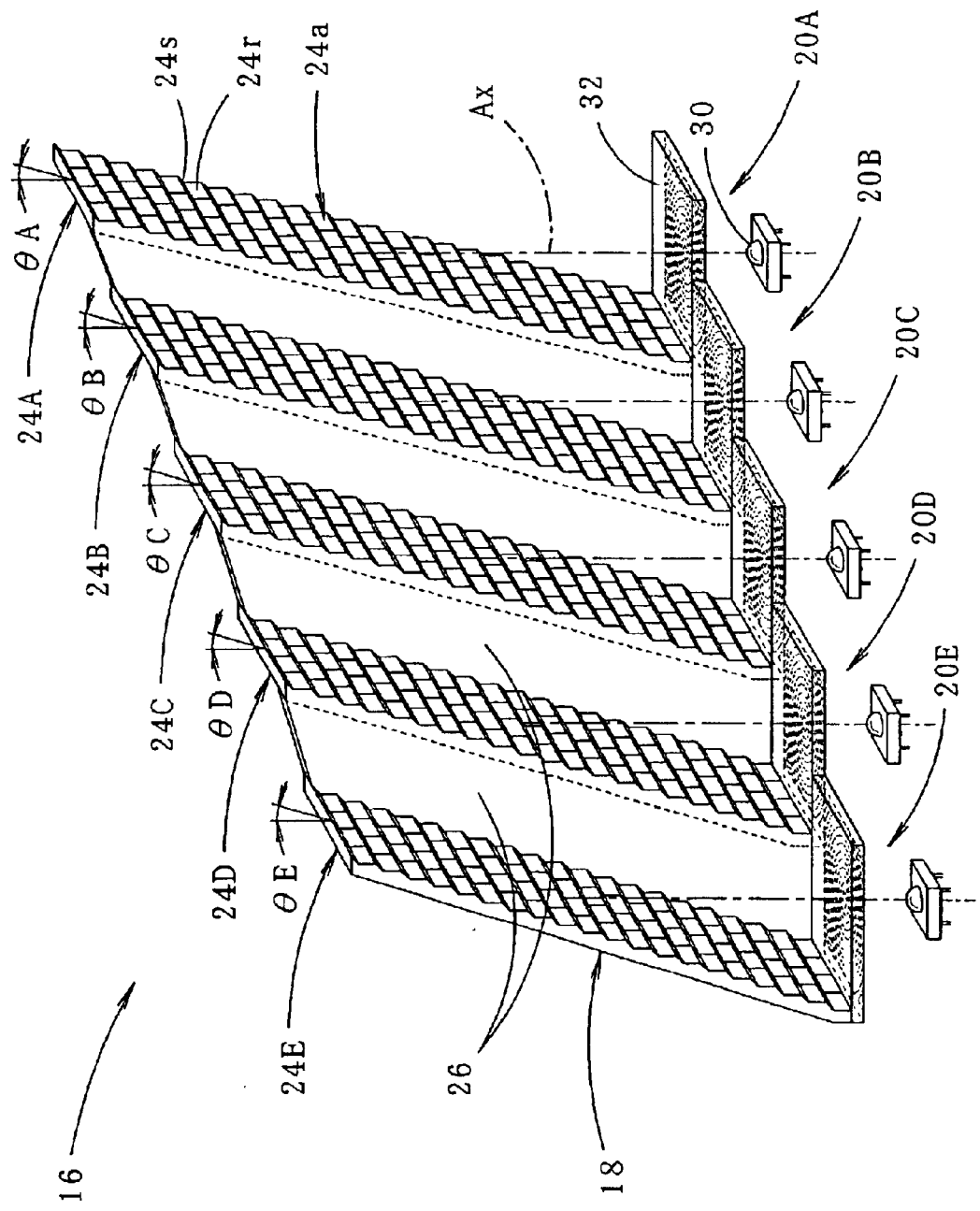
FIG. 6 is partially cut-away, perspective view showing the lamp unit of FIG. 1.
Figure 7:
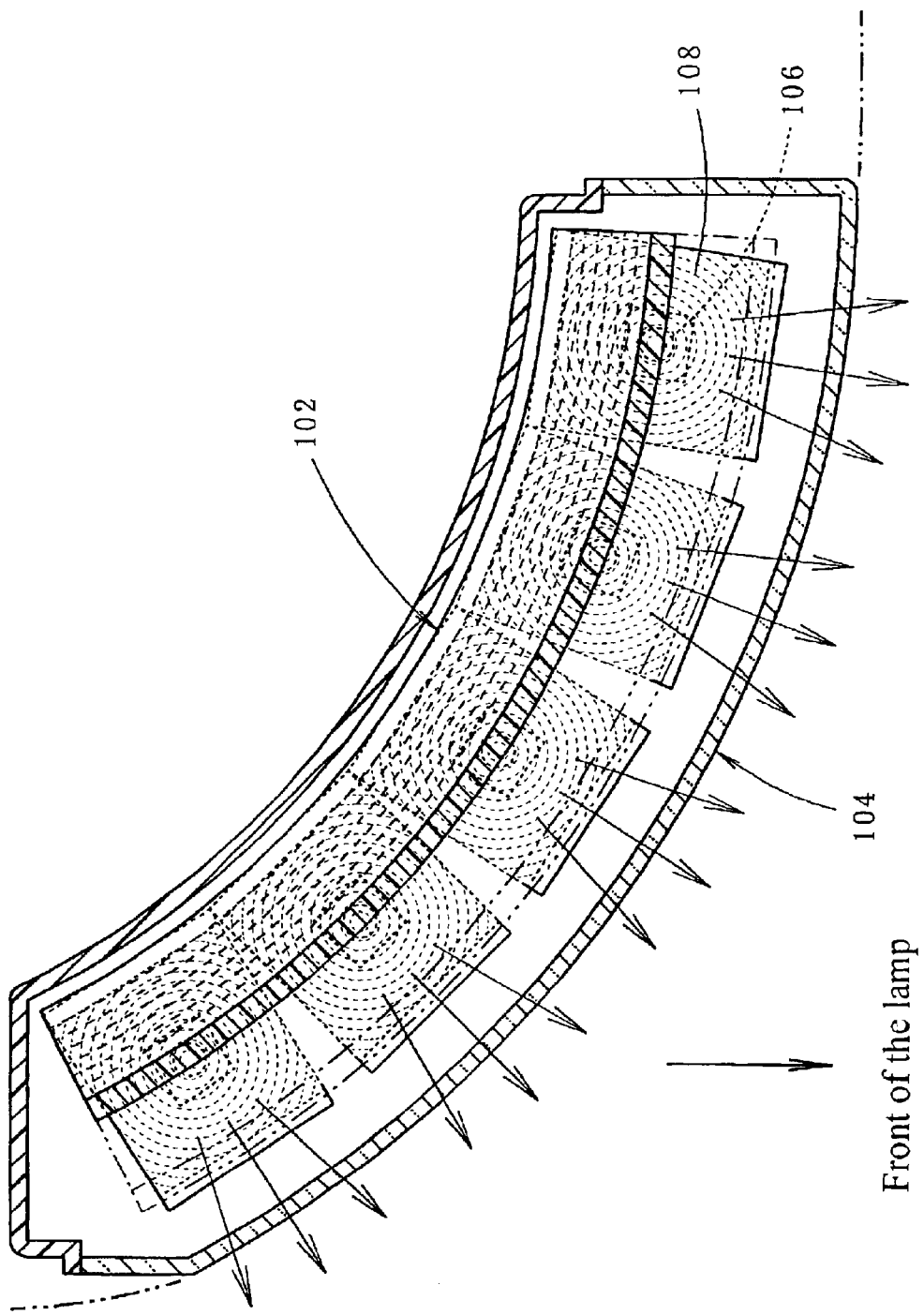
FIG. 7 is a similar view to FIG. 2 but showing a conventional lamp.

FIG. 6 is a perspective view showing the lamp unit 16 in a partly simplified manner.

As illustrated, since the sub-reflectors 24A to 24E of the respective LED units 20A to 20E constituting the lamp unit 16 reflect the parallel light fluxes from the respective Fresnel lenses 32 toward the front of the lamp without loss, the sub-reflectors are formed such that the tilt angle relative to the front of the lamp, that is, the vertical direction of the lamp, becomes larger as the height of the sub-reflector is reduced. That is, the tilt angles θA to θE of the respective sub-reflectors 24A to 24E are set so as to satisfy the relation θA<θB<θC<θD<θE.

Further, the respective sub-reflectors 24A to 24E are structured such that the sub-reflectors which are adjacent to one another are connected to each other via a vertical boundary wall 26 extending in the longitudinal direction of the lamp, whereby the reflector 18 is integrally formed.

As described in detail described above, the vehicular lamp 10 according to the present embodiment is structured such that the lamp unit 16 is constituted by five LED units 20A to 20E, and the respective LED units 20A to 20E are arranged so the the directions of the parallel light fluxes from the Fresnel lenses 32 are aligned with one another. The reflector 18 reflecting the parallel light fluxes from the respective Fresnel lenses 32 toward the front of the lamp is separated into the sub-reflectors 24A to 24E for every area which the parallel light fluxes from the respective Fresnel lenses 32 strike (for respective LED units 20A to 20E), and the respective sub-reflectors 24A to 24E are arranged in a stepped configuration stepping rearward in the lateral direction of the reflector 18 from the front end toward the rear end of the lamp. With this structure, the following effects can be obtained.

That is, since the reflector 18 is constituted by a plurality of sub-reflectors 24A to 24E arranged in a stepped configuration, it is possible to form the reflector 18 so as to follow the shape of the translucent cover 14, which wraps around to the rear of the lamp, while reflected light from the respective sub-reflectors 24A to 24E is radiated toward the front of the lamp.

Therefore, according to the vehicular lamp of the above-described embodiment which is structured such that the light is radiated by indirect illumination using a plurality of LED light sources, it is possible to achieve a thin structure of the lamp while ensuring sufficient light output to the front of the lamp, even in the case where the lamp is mounted in a wrap-around portion of the vehicle body.

Further, the heights of the respective sub-reflectors 24A to 24E constituting the reflector 18 are different from each other, and the sub-reflectors are formed such that the tilt angle relative to the front of the lamp increases as the height thereof becomes smaller (θA<θB<θC<θD<θE). Therefore, it is possible to form all the parallel light fluxes from the respective Fresnel lenses 32 striking the reflecting surface 24a of each of the sub-reflectors 24A to 24E without loss.

Still further, since the reflecting surfaces 24a of each of the sub-reflectors 24A to 24E are divided into a plurality of segments, and the reflector is formed in a stepped configuration by providing a reflective element 24s and step portion 24r in each of the segments, it is possible to effectively radiate the light to the front of the lamp.

Since each of the reflective elements 24s is constituted by a curved surface for reflecting the parallel light flux from the Fresnel lens 32 in a diffused manner in the vertical and lateral directions, it is possible to obtain the required lamp light distribution performance even if the translucent cover 14 is plain in form. Moreover, the following effects can be obtained.

That is, as shown in FIG. 1, when viewing the lamp unit 16 when lit from the direction directly in front of the lamp, the reflecting surface 24a of each of the sub-reflectors 24A to 24E appears lit in a scattered manner in all directions at every reflective element 24s. In the drawing, a portion shown by reference symbol B is a bright portion that appears lit, and this bright portion B is positioned at the center of each of the reflective elements 24s. When moving the viewing point upward, downward, rightward, and leftward from a position directly in front of the lamp, the position of the bright portion B also moves upward, downward, rightward, and leftward within each of the reflective elements 24s. However, since the diffusion angle of each of the reflective elements 24s is the same among the respective reflective elements 24s, all the reflective elements 24s appear bright until the limits of the diffusion angle are exceed, whereupon all the reflective elements 24s become dark at once. Accordingly, the appearance of the lamp is further improved.

Rather than constructing each of the reflective elements 24s as a substantially spherical curved surface as in the above-described embodiment, it is possible to diffuse the light in the both the vertical and lateral directions by constructing each of the reflective elements 24s as a flat plane so as to reflect the parallel light flux from the Fresnel lens 32 toward the front of the lamp while maintaining the light flux in a parallel state, in which case diffusion lens elements are formed in the translucent cover 14 (or an inner lens). Alternatively, it is possible to reflect the parallel light flux from the Fresnel lens 32 toward the front of the lamp in a diffused manner only in one direction by constructing each of the reflective elements 24s as a curved surface having a curvature only in one direction, and with diffusion lens elements formed in the translucent cover 14 or the like to diffuse the light in a direction perpendicular to the above-mentioned direction.

In the embodiment described above, a description has been given of the case where the respective LED units 20 are arranged in the lateral direction. However, the same effects can be obtained in the case where the respective LED units 20 are arranged in the vertical direction.

Further, the embodiment described above relates to a case where the lamp unit 16 is intended for use as a tail and stop lamp. However, the inventive concept can be applied to other types of lamp units, for example, a lamp unit for a clearance lamp or the like, while retaining the same effects.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising: a plurality of LED light sources; a plurality of lenses for forming light from respective ones of said LED light sources into parallel light fluxes; a reflector for reflecting the parallel light fluxes from said lenses toward a front of said lamp; and a translucent cover provided on a front of said reflector, said lenses being arranged so that radiating directions of said parallel light fluxes are aligned with one another, said reflector being divided into sub-reflectors with one sub-reflector being provided for every area of said reflector which said parallel light fluxes from said respective lenses strike, and said sub-reflectors being arranged in a stepped configuration stepping rearward from a front end of said lamp toward a rear end of said lamp.

2. The vehicular lamp according to claim 1, wherein said sub-reflectors have different lengths from each other in said radiating directions of said parallel light fluxes, and said sub-reflectors are formed such that a tilt angle of each of said sub-reflectors with respect to a vertical direction of said lamp increases as the lengths of said sub-reflectors in said radiating directions of said parallel light fluxes decrease.

3. The vehicular lamp according to claim 2, wherein a height of said sub-reflectors decreases from said front end of said lamp to said rear end of said lamp.

4. The vehicular lamp according to claim 1, wherein a reflecting surface of each of said sub-reflectors is divided into a plurality of segments, and a reflective element and a step portion are formed in each of said segments, whereby said reflecting surface is formed in a stepped configuration.

5. The vehicular lamp according to claim 4, wherein each of said reflective elements comprises a curved surface which reflects said parallel light fluxes in a diffused manner in a vertical direction and a lateral direction.

6. The vehicular lamp according to claim 5, wherein each of said reflective elements comprises a curved surface which reflects said parallel light fluxes in a diffused manner in one of a vertical direction and a lateral direction, and wherein said cover comprises lens elements for diffusing light transmitted through said cover in the other of said vertical and lateral directions.

7. The vehicular lamp according to claim 4, wherein each of said reflective elements comprises a planar surface which reflects said parallel light fluxes toward said cover while maintaining said light fluxes in a parallel state, and wherein said cover comprises lens elements for diffusing light transmitted through said cover in vertical and lateral directions.

8. The vehicular lamp according to claim 1, wherein a reflecting surface of each of said sub-reflectors is divided into a plurality of segments, and a reflective element and a step portion are formed in each of said segments, whereby said reflecting surface is formed in a stepped configuration, said sub-reflectors having different lengths and different numbers of said segments from each other with respect to said radiating directions of said parallel light fluxes.

9. The vehicular lamp according to claim 8, wherein said sub-reflectors are formed such that a tilt angle relative to a front of said lamp of said sub-reflectors increases as a length in said radiating directions of said parallel light fluxes decreases.

10. The vehicular lamp according to claim 1, further comprising boundary walls joining adjacent ones of said sub-reflectors.

11. A vehicular lamp comprising: a plurality of LED light sources; a plurality of Fresnel lenses for forming light from respective ones of said LED light sources into upward directed parallel light fluxes whose radiating directions are aligned with one another; a reflector for reflecting the parallel light fluxes from said lens toward a front of said lamp, said reflector being divided into sub-reflectors with one sub-reflector being provided for every area of said reflector which the parallel light fluxes from said respective lenses strike, said sub-reflectors being arranged in a stepped configuration stepping rearward from a front end of said lamp toward a rear end of said lamp, said sub-reflectors having different lengths from each other in said radiating directions of said parallel light fluxes conforming to a shape of said lamp, and said sub-reflectors being formed such that a tilt angle of said sub-reflectors with respect to a vertical direction of said lamp increases as the lengths of said sub-reflectors in said radiating directions of said parallel light fluxes decrease; and a translucent cover provided on a front of said reflector.

12. The vehicular lamp according to claim 11, wherein a reflecting surface of each of said sub-reflectors is divided into a plurality of segments and a reflective element and a step portion are formed in each of said segments, whereby said reflecting surface is formed in a stepped configuration, and wherein each of said reflective elements comprises a curved surface which reflects said parallel light fluxes in a diffused manner in a vertical direction and a lateral direction, and wherein said cover is plain.

13. The vehicular lamp according to claim 11, wherein a reflecting surface of each of said sub-reflectors is divided into a plurality of segments and a reflective element and a step portion are formed in each of said segments, whereby said reflecting surface is formed in a stepped configuration, and wherein each of said reflective elements comprises a curved surface which reflects said parallel light fluxes in a diffused manner in one of a vertical direction and a lateral direction, and wherein said cover comprises lens elements for diffusing light transmitted through said cover in the other of said vertical and lateral directions.

14. The vehicular lamp according to claim 11, wherein a reflecting surface of each of said sub-reflectors is divided into a plurality of segments and a reflective element and a step portion are formed in each of said segments, whereby said reflecting surface is formed in a stepped configuration, wherein each of said reflective elements comprises a planar surface which reflects said parallel light fluxes toward said cover while maintaining said light fluxes in a parallel state, and wherein said cover comprises lens elements for diffusing light transmitted through said cover in vertical and lateral directions.

15. The vehicular lamp according to claim 11, wherein a height of said sub-reflectors decreases from said front end of said lamp to said rear end of said lamp.

* * * * *